United States Patent [19]

Manchester

[11] Patent Number: 4,479,477
[45] Date of Patent: Oct. 30, 1984

[54] DIESEL FUEL HEATER AND COMBINED FILTER-HEATER ASSEMBLY

[75] Inventor: Stephen T. Manchester, Limerick, Me.

[73] Assignee: GTE Products Corporation, Stamford, Conn.

[21] Appl. No.: 490,069

[22] Filed: Apr. 29, 1983

[51] Int. Cl.³ .......................................... F02M 31/00
[52] U.S. Cl. .................................. 123/557; 123/549; 210/186
[58] Field of Search ................ 123/557, 196 AB, 549; 210/184, 186, 185; 219/306, 307, 548, 504, 505; 431/208, 209

[56] References Cited

U.S. PATENT DOCUMENTS

| | | | |
|---|---|---|---|
| 4,091,265 | 5/1978 | Richards | 123/557 |
| 4,092,963 | 6/1978 | Vrooman | 123/557 |
| 4,177,778 | 12/1979 | Naitou | 123/557 |
| 4,227,969 | 10/1980 | Engel | 210/184 |
| 4,279,234 | 7/1981 | Marcoux | 123/557 |
| 4,354,946 | 10/1982 | Warlich | 210/184 |
| 4,387,691 | 6/1983 | Marcoux | 210/186 |
| 4,395,996 | 8/1983 | Davis | 123/557 |
| 4,406,788 | 9/1983 | Siefer | 123/557 |

Primary Examiner—Ronald H. Lazarus
Attorney, Agent, or Firm—J. Theodosopoulos

[57] ABSTRACT

A diesel fuel heater which is readily adapted for serving as a retrofit to existing diesel filter components, e.g., such as utilized in some existing automobile diesel engines. The heater includes a cylindrical plastic housing, and a flat annular conductive mounting plate located within the housing and containing thereon a plurality of positive temperature coefficient (PTC) thermistors designed for contacting diesel fuel passing through the housing and for heating same. A contact spring means is utilized to provide electrical current to each of the thermistors, said contact spring means electrically coupled to an electrical terminal which projects from the insulative housing and is designed for being connected to a suitable power source. An adapter is utilized to interconnect the housing of the diesel fuel filter component with a disposable filter typically utilized with such a housing to maintain both of these members in a spaced-apart relationship. The heater's housing may thus be readily positioned between and in contact with both members to heat diesel fuel passing therethrough.

26 Claims, 2 Drawing Figures

DIESEL FUEL HEATER AND COMBINED FILTER-HEATER ASSEMBLY

TECHNICAL FIELD

The present invention relates, in general, to diesel fuel heaters, and more particularly to diesel fuel heaters which employ positive temperature coefficient (PTC) thermistors as the heat source thereof.

BACKGROUND OF THE INVENTION

The use of diesel engines has increased substantially in recent years, particularly in the automotive field. This increased popularity is due to, among other things, improved fuel mileage in comparison to today's standard gasoline engine. In addition, diesel engines typically produce emissions at significant reduced pollutant levels when compared to those of standard gasoline engines. One problem associated with diesel engines, however, is that they have been characteristically difficult to start in cold weather. This is due primarily to an inherent tendency of the diesel fuel to gel in sufficiently cold temperatures, thus causing such starting difficulties. In addition, engines which use fuels in this condition possess a relatively high tendency to stall, even after having been successfully started.

To overcome this problem fuel line heaters have been utilized, such as the variety that employs a resistance wire wrapped within an insulator. However, heaters of this variety, typically located along the fuel line supplying the engine, have not proven to be very efficient.

In Ser. No. 334,292, filed Dec. 4, 1981 and entitled "Diesel Fuel Heater" (Inventor: David A. Siefer), there is defined a fuel heater which employs at least one positive temperature coefficient thermistor located in the fuel passage of the heater's housing for raising the temperature of the fuel passing therethrough to hopefully reduce gelling. One drawback of this heater, however, is that it is not readily adaptable to currently existing diesel filter components (those typically employing an upper filter housing and a lower spin-on disposable filter), thus requiring substantial modification to such designs in order to incorporate the advantages of this heater therein.

It is believed, therefore, that a diesel fuel heater which is readily adaptable for use as a retrofit in existing diesel fuel filter components to provide the several substantial advantages cited hereinbelow would constitute a significant advancement in the art. It is further believed that a combined diesel fuel heater and heater assembly possessing the advantageous features cited hereinbelow would constitute an art advancement. It will be also understood from the following description that the instant invention possesses other distinguishing features than those cited above when compared to the device described in Ser. No. 334,292 including, among other things, an improved means for coupling electrical power to the compact fuel heater component.

DISCLOSURE OF THE INVENTION

Accordingly, it is a primary object of the present invention to provide a substantially improved diesel fuel heater, and particularly one which employs PTC thermistors as the heat source thereof.

It is another object of the invention to provide a combined diesel fuel filter and heater assembly which utilizes PTC thermistors as the heat source thereof.

It is yet another object of the invention to provide a diesel fuel heater which is compact in design and relatively inexpensive to produce, and which can be readily utilized as a retrofit in many existing diesel fuel filter components.

In accordance with one aspect of the invention, there is provided a diesel fuel heater for use with a fuel filter housing having a fuel inlet and a fuel outlet therein, and a fuel filter element designed for being normally secured to the fuel filter's housing. The diesel fuel heater of the invention comprises an insulative housing having a fuel inlet therein, an electrically conductive mounting plate secured within a lower part of the insulative housing and having a fuel outlet therein, the mounting plate and insulative housing defining a fuel passage therein through which diesel fuel passing from the filter housing to the filter element will pass, a plurality of positive temperature coefficient thermistors spacedly positioned on the mounting plate and designed for contacting the fuel and heating same prior to its entry into the filter element, means for coupling electrical power to the spacedly positioned thermistors, and an adapter means positioned substantially within the insulative housing for interconnecting the fuel filter housing and the filter element at a spaced-apart relationship such that the fuel heater will be located between both of these members.

In accordance with another aspect of the invention, there is provided a diesel fuel filter and heater assembly which comprises a fuel filter housing having a fuel inlet and outlet therein, a fuel filter element designed for being normally secured to the fuel filter housing to filter diesel fuel passing therethrough, and a diesel fuel heater located between the housing and filter element for having the diesel passing from the filter to the element pass therethrough and designed for heating such fuel during said passing. This diesel fuel heater includes the several elements defined in the preceding paragraph.

BEST MODE FOR CARRYING OUT THE INVENTION

Figure 1:
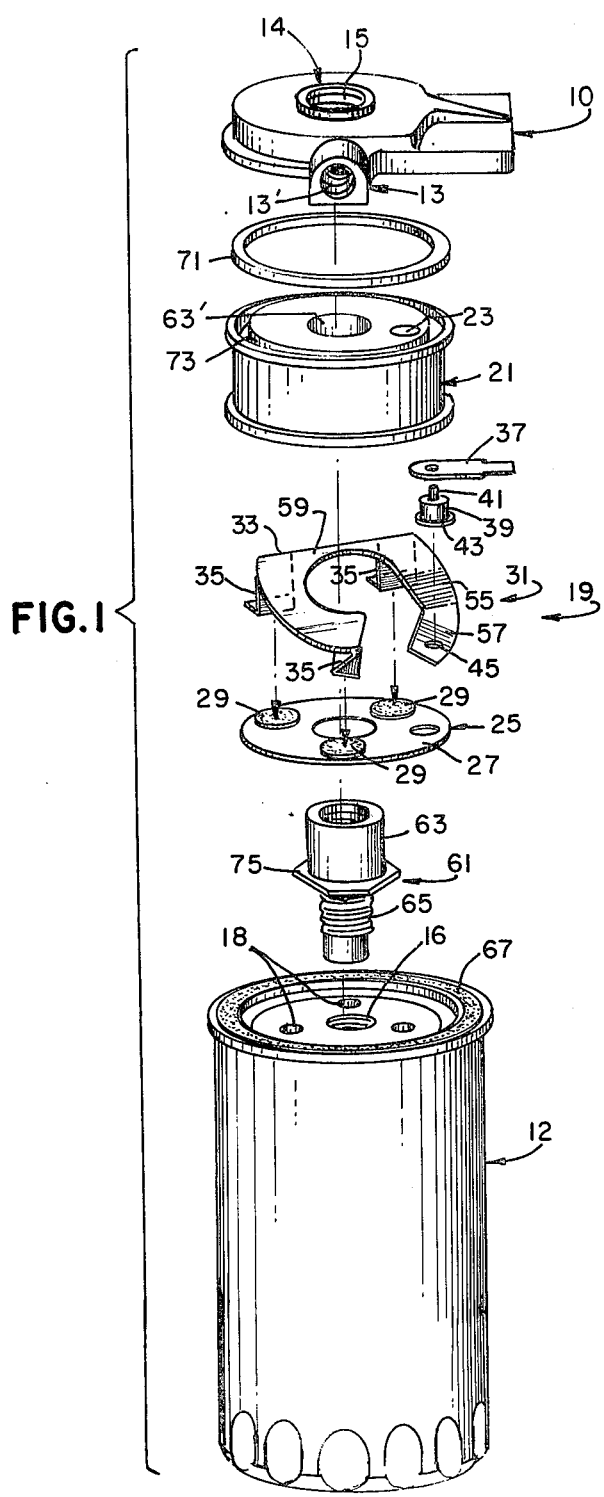
FIG. 1 is an exploded perspective view of a preferred embodiment of the instant invention.

For a better understanding of the present invention, together with other and further objects, advantages and capabilities thereof, reference is made to the following disclosure and appended claims in connection with the above-described drawings.

With particular reference to the drawings, there is shown a diesel fuel filter housing 10 adapted for having a disposable filter element 12 secured thereto. For this purpose, housing 10 is provided with a fuel inlet pipe 13 which is internally threaded (at 13') and a fuel outlet pipe 14 which is also internally threaded (at 15) such that diesel fuel will enter inlet 13, pass through and be filtered by filter 12, and exit outlet 14. The disposable filter 12 has an internally threaded aperture 16 which is designed for being screwed onto a protruding, externally threaded male member 17 which forms part of housing 10. Typically, the disposable filter is threaded onto housing 10 until it provides a fluidtight seal against a lower surface thereof. A rubber gasket has been traditionally utilized to assure this seal. In operation, diesel fuel entering inlet 13 is forced through a plurality of orifices 18 spacedly oriented within an upper wall of the filter element Filtered fuel was thereafter passed up through the central aperture 16 and out outlet 14 of housing 10.

The above method of operation, as stated, is typical of many diesel fuel filter components such as those presently utilized in some of today's automotive diesel engines. As also stated above, a particular problem which occurs frequently in fuel systems for diesel engines is the tendency of the diesel fuel to gel at substantially lower temperatures. The result is extreme difficulties when starting the engines at such temperatures, in addition to a ready tendency of started engines to stall.

To overcome the above, the instant invention comprises a diesel fuel heater 19 which is extremely compact in design and which may be readily utilized in existing filter components used today. Diesel fuel heater 19 comprises an electrically insulative housing 21 of substantially cylindrical configuration and (preferably possessing a similar outer diameter to that of the also cylindrical disposable filter 12). A preferred material for housing 21 is plastic (e.g., phenolic or nylon). Located within a top wall of housing 21 is a fuel inlet 23 which, in final assembly, is arranged such that fuel entering inlet 13 will pass into and through inlet 23.

Heater 19 also comprises an electrically conductive mounting plate 25 which is preferably planar and also of substantially cylindrical configuration. Plate 25, a sound heat conductor and preferably metallic, is designed for being mounted within a lower part of insulative housing 21 in the manner depicted in FIG. 2. Preferred materials for plate 25 include copper, aluminum and steel, with the most preferred being copper. Located within the planar plate 25 is a fuel outlet 27 through which the fuel heated by the invention will pass prior to entering the several orifices 18 in filter element 12. Accordingly, mounting plate 25, when securely positioned within housing 21, combines with the insulative housing to define a fuel passage FP (FIG. 2) through which fuel will pass. Understandably, fuel passage FP extends from inlet 23, through the hollow peripheral portion of housing 21 and thereafter through outlet 27. In FIG. 1, this would be in a substantially clockwise direction.

To heat fuel passing through the housing of the invention, a plurality of positive temperature coefficient (PTC) thermistors 29 are utilized and spacedly positioned about an upper surface of mounting plate 25. Preferably, each of the several PTC thermistors 29 utilized in the invention is of the low temperature switching variety, having a switching temperature within the range of about 0° Celsius to about 15° Celsius. With this type of a PTC thermistor, substantial wattage is expended at low fuel temperatures to effectively dewax the fuel. As fuel temperature increases with increasing ambient, power consumption is reduced in keeping with traditional PTC operation. As stated, several PTC thermistors are utilized in the invention and in one example, a total of seven such elements was utilized. The operation of PTC thermistors is well documented and further description is not believed necessary.

As illustrated in the drawings, each of the thermistors of the invention are positioned to readily contact diesel fuel passing within the heater and thus for heating said fuel to the established temperature. Understandably, the mounting plate having the PTCs located thereon is also heated and thus serves as a second fuel heating means.

Diesel fuel heater 19 further includes means 31 for coupling electrical power (e.g., from the automobile's electrical system) to each of the described spacedly position thermistors 29. Power coupling means comprises a substantially annular, metallic contact spring means 33 which is designed for being positioned within the insulative housing 21. Spring means 33 is of a sound electrically conductive metallic material (e.g., phosphor bronze or beryllium copper) and includes a plurality of individual spring members 35, each designed for physically engaging a respective one of the spacedly positioned thermistors. To provide the desired electrical current to contact spring means 33, a metallic electrical terminal 37 of substantially flat configuration is utilized. As clearly illustrated in FIG. 2, terminal 37 is strategically positioned within a side wall of the insulative housing 21 and projects externally thereof. In operation, the projecting end of terminal 37 is designed for having a suitable connector (which forms part of the automobile's circuitry) positioned thereon. Terminal 37, being electrically coupled to contact spring means 33 and therefore to each of the several PTC thermistors, thus readily assures a facile means for providing electrical current to the thermistors to achieve energization thereof.

As also depicted in the drawings, power coupling means 31 further includes an optional thermostat 39 which includes an upstanding cyclindrical projection 41 designed for having terminal 37 positioned thereon (and thus in electrical contact therewith). The lower part of the thermostat also includes a projecting cylindrical end 43 designed for being inserted within a corresponding opening 45 located within a lower arm segment of contact spring means 33. Thermostat 39 is thus electrically connected at the bottom end thereof to the highly conductive contact spring means 33. The function of thermostat 39 in the present invention, if utilized, is to completely interrupt current flow to the PTC thermistors at a predetermined temperature. Accordingly, when employed, the thermostat is designed to go "on" at an established fuel temperature and then switch "off" at a second, higher temperature. Thermostat 39 thus assures that current will flow only when the temperature of the fuel is within these limits. If higher temperature PTCs (those requiring more power) are used, such components assure that the fuel temperature will be retained within the limits defined because PTC current limiting is reduced. In one example, thermostat 39 was designed for having an "on" temperature at about −4° Celsius and an "off" temperature of about 14° Celsius.

With particular regard to FIG. 1, contact spring means 33 is illustrated as including a bent (angular) segment 55. When assembled, segment 55 aligns immediately adjacent outlet 27 to assist in deflecting diesel fuel passing into housing 21 forward through fuel passage FP. As also shown, the contact spring means 33 includes the described lower arm segment (57) which is designed for being located on the upper surface of mounting plate 25. In comparison, the upper, main body portion 59 of contact spring means 33 is located substantially against an internal surface of the top wall of housing 21. This top wall, as shown, also includes the fuel inlet 23, and in the arrangement depicted, it can thus be seen that bent segment 55 also serves to promote passage of diesel fuel entering housing 21 in the desired, clockwise direction. That is, fuel passing through inlet 23 strikes the upper surface of segment 55 and thereafter proceeds in the defined clockwise direction within fuel passage FP.

To enable heater 19 to be readily incorporated within a typical diesel filter component (such as housing 10 and disposable filter 12), the invention further comprises an adapter means 61 which, in final assembly, is positioned substantially within the central portion of housing 21 (within an orifice 63 therein). Adapter 61 serves to provide an interconnection for housing 10 and filter 12 in such a manner so as to maintain these members in a spaced-apart relationship such that the insulative housing 21 and remaining components of heater 19 may be positioned between both members. As shown, adapter 61 also enables the provision of fluidtight seals between the upper and lower surfaces of the heater's housing and the spaced apart members. Accordingly, the invention allows for a facile retrofit to many existing diesel fuel filter components. Accordingly, individuals presently utilizing a diesel fuel filter component, such as housing 10 and disposable filter 12, need only to remove the disposable filter and insert the instant invention therebetween. Filter 12 is then replaced or, alternatively, a new disposable filter may be added.

To provide this unique assembly, adapter 61 includes an internally threaded, upstanding boss member 63 adapted for being threaded onto the externally threaded male member 17 of housing 10. In addition, adapter 61 comprises an externally threaded projecting portion 65 which is adapted for being threaded into the internally threaded orifice 16 of filter 12. As stated, orifice 16 was originally designed for having the threaded member 17 of housing 10 positioned therein. Assembly is accomplished by merely threading portion 65 into orifice 16, inserting boss 63 within the central aperture 63' of housing 21, and thereafter threading boss 63 onto male element 17 until a tight fit is attained.

Housing 21, being substantially cylindrical and of a similar outer diameter to filter 12, includes a substantially planar lower surface much like that of housing 10 to thus mate effectively with a gasket 67 typically utilized in filter elements. An effective fluidtight seal is thus assured between the bottom part of the heater's insulative housing and filter element 12. To provide an effective seal with the upper part of housing 21 and corresponding housing 10, an annular gasket 71 is provided. To accommodate gasket 71, an annular channel 73 is provided within the upper surface of the heater's insulative housing 21.

Figure 2:
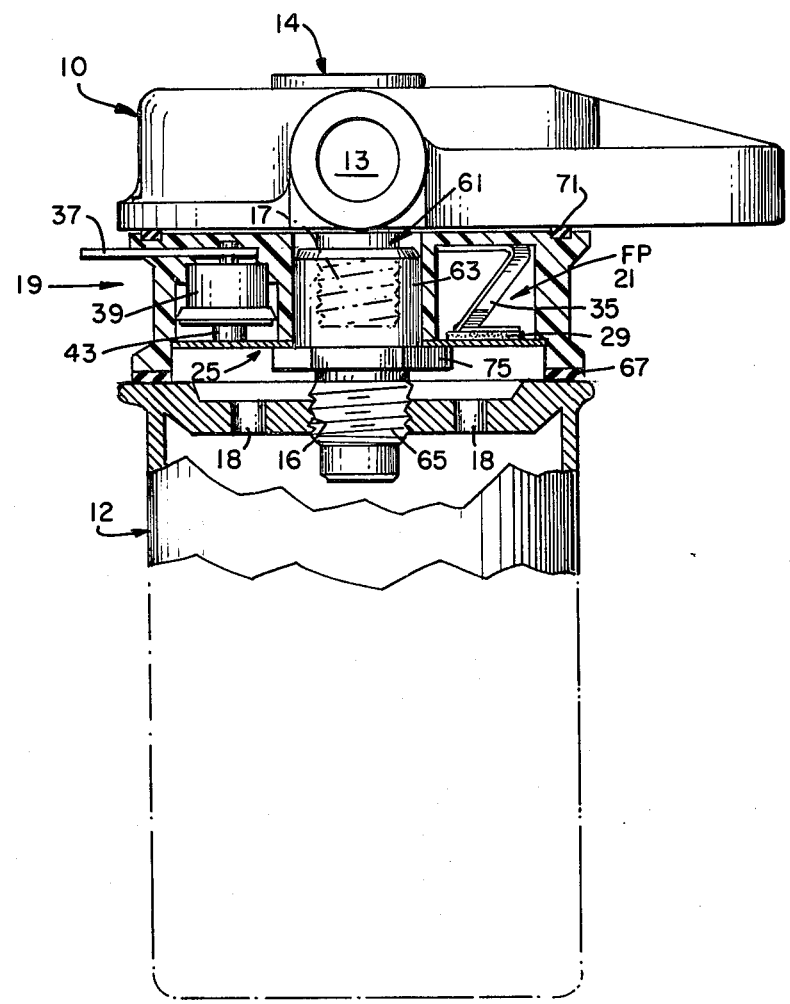
FIG. 2 is an enlarged side elevational view of the invention depicted in FIG. 1 shown in assembled form and partly in section to illustrate the positioning relationships of the various elements thereof.

To further assist in maintaining mounting plate 25 in position within insulative housing 21, adapter 61 includes a flange portion 75 which positively engages the bottom surface of plate 25 to force it against a corresponding internal ledge within housing 21 when boss 63 is threaded onto the male element 17. This arrangement is best depicted in FIG. 2, and also serves to assist in maintaining housing 21 against the filter's housing 10.

There has thus been shown and described a diesel fuel heater which possesses several advantageous features over heaters presently utilized in the art. Perhaps most importantly, the heater of the invention is readily adapted for providing a retrofit to existing diesel filter components without the need for modification thereto. In addition, the invention as defined herein is substantially compact in design and relatively inexpensive to produce.

While there have been shown and described what are at present the preferred embodiments of the invention, it will be obvious to those skilled in the art that various changes and modifications may be made therein without departing from the scope of the invention as defined by the appended claims.

What is claimed is:

1. A diesel fuel heater for use with a fuel filter housing having a fuel inlet and a fuel outlet therein and a fuel filter element adapted for being normally secured to said fuel filter housing, said heater comprising:
   an electrically insulative housing having a fuel inlet therein;
   an electrically conductive mounting plate securedly positioned within a lower part of said insulative housing and having a fuel outlet therein, said mounting plate and said insulative housing defining a fuel passage within said insulative housing extending from said fuel inlet to said fuel outlet;
   a plurality of positive temperature coefficient thermistors spacedly positioned on said conductive mounting plate for contacting said diesel fuel passing through said fuel passage and for heating said fuel to an established temperature;
   means for coupling electrical power to each of said spacedly positioned thermistors on said mounting plate; and
   adapter means positioned substantially within said insulative housing for interconnecting said fuel filter housing and said fuel filter element at a spaced apart relationship whereby said fuel heater will be positioned between said fuel filter housing and said filter element such that fuel passing from said fuel filter housing to said filter element will pass through said fuel passge and be heated by said thermistors.

2. The diesel fuel heater according to claim 1 wherein said fuel filter housing includes an externally threaded male member, said adapter means comprising an internally threaded boss member adapted for having said male member positioned therein.

3. The diesel fuel heater according to claim 2 wherein said fuel filter element includes a threaded orifice adapted for having said threaded male member of said fuel filter housing positioned therein, said adapter means further comprising an externally threaded projecting portion adapted for being positioned within said threaded orifice of said fuel filter element in place of said threaded male member of said fuel filter housing when said fuel heater is positioned between said fuel filter housing and said fuel filter element.

4. The diesel fuel heater according to claim 3 wherein said adapter means further comprises a flange portion for engaging an exterior surface of said mounting plate to assist in maintaining said mounting plate in position within said insulative housing and said insulative housing against said fuel filter housing.

5. The diesel fuel heater according to claim 4 further including gasket means for providing a seal between said fuel filter housing and said insulative housing of said heater means.

6. The diesel fuel heater according to claim 1 wherein the material of said insulative housing is plastic.

7. The diesel fuel heater according to claim 1 wherein said fuel filter element and said electrically insulative housing are each of a substantially cylindrical configuration having approximately the same external diameters.

8. The diesel fuel heater according to claim 1 wherein the material of said conductive mounting plate is selected from the group consisting of copper, aluminum and steel.

9. The diesel fuel heater according to claim 1 wherein each of said thermistors is a low temperature thermistor having a switching temperature within the range of from about 0° Celsius to about 15° Celsius.

10. The diesel fuel heater according to claim 1 wherein said power coupling means comprises a contact spring means located within said insulative housing and including a plurality of spring members, each of said spring members engaging a respective one of said thermistors.

11. The diesel fuel heater according to claim 10 wherein said power coupling means further comprises an electrical terminal member coupled to said contact spring means, said terminal member positioned within a side wall of said insulative housing of said fuel heater and projecting externally thereof.

12. The diesel fuel heater according to claim 11 wherein said power coupling means further comprises a thermostat located within said insulative housing of said fuel heater and electrically connected to said electrical terminal member and said contact spring means.

13. The diesel fuel heater according to claim 12 wherein said thermostat is operational within a temperature range of from about −4° Celsius to about 14° Celsius.

14. A diesel fuel filter and heater assembly comprising:
a fuel filter housing having a fuel inlet and a fuel outlet therein;
a fuel filter element adapted for being normally secured to said fuel filter housing for filtering diesel fuel passing therethrough; and
a diesel fuel heater positioned between said fuel filter housing and said fuel filter element for having said diesel fuel passing from said fuel filter housing to said fuel filter element pass therethrough and for heating said diesel fuel during said passing therethrough, said diesel fuel heater including an electrically insulative housing having a fuel inlet therein, an electrically conductive mounting plate securedly positioned within a lower part of said insulative housing and having a fuel outlet therein, said mounting plate and said insulative housing defining a fuel passage therein extending from said fuel inlet to said fuel outlet, a plurality of positive temperature coefficient thermistors spacedly positioned on said conductive mounting plate for contacting said diesel fuel passing through said fuel passage and for heating said diesel fuel to an established temperature, means for coupling electrical power to each of said spacedly positioned thermistors on said mounting plate, and adapter means positioned substantially within said insulative housing for interconnecting said fuel filter housing and said fuel filter element at a spaced apart relationship whereby said fuel heater will occupy said position between said fuel filter housing and said filter element.

15. The diesel fuel filter and heater assembly according to claim 14 wherein fuel filter housing includes an externally threaded male member, said adapter means comprising an internally threaded boss member adapted for having said male member positioned therein.

16. The diesel fuel filter and heater assembly according to claim 15 wherein said fuel filter element includes a threaded orifice adapted for having said threaded male member of said fuel filter housing positioned therein, said adapter means further comprising an externally threaded projecting portion adapted for being positioned within said threaded orifice of said fuel filter element in place of said threaded male member of said fuel filter housing when said fuel heater is positioned between said fuel filter housing and said fuel filter element.

17. The diesel fuel filter and heater assembly according to claim 16 wherein said adapter means further comprises a flange portion for engaging an exterior surface of said mounting plate to assist in maintaining said mounting plate in position within said insulative housing and said insulative housing against said fuel filter housing.

18. The diesel fuel filter and heater assembly according to claim 17 further including gasket means for providing a seal between said fuel filter housing and said insulative housing of said heater means.

19. The diesel fuel filter and heater assembly according to claim 14 wherein the material of said insulative housing is plastic.

20. The diesel filter and heater assembly according to claim 14 wherein said fuel filter element and said electrically insulative housing are each of a substantially cylindrical configuration having approximately the same external diameters.

21. The diesel fuel filter and heater assembly according to claim 14 wherein the material of said conductive mounting plate is selected from the group consisting of copper, aluminum and steel.

22. The diesel fuel filter and heater assembly according to claim 14 wherein each of said thermistors is a low temperature thermistor having a switching temperature within the range of from about 0° Celsius to about 15° Celsius.

23. The diesel fuel filter and heater assembly according to claim 14 wherein said power coupling means comprises a contact spring means located within said insulative housing and including a plurality of spring members, each of said spring members engaging a respective one of said thermistors.

24. The diesel fuel filter and heater assembly according to claim 23 wherein said power coupling means further comprises an electrical terminal member coupled to said contact spring means, said terminal member positioned within a side wall of said insulative housing of said fuel heater and projecting externally thereof.

25. The diesel fuel filter and heater assembly according to claim 24 wherein said power coupling means further comprises a thermostat located within said insulative housing of said fuel heater and electrically connected to said electrical terminal member and said contact spring means.

26. The diesel fuel filter and heater assembly according to claim 25 wherein said thermostat is operational within a temperature range of from about −4° Celsius to about 14° Celsius.

* * * * *